United States Patent

Fu

[11] Patent Number: 5,361,210
[45] Date of Patent: Nov. 1, 1994

[54] CURRENT CONTROL FOR ELECTRIC POWER STEERING APPARATUS MOTOR

[75] Inventor: Jian-Guo Fu, Yamatokooriyama, Japan

[73] Assignee: Koyo Seiko Co., Ltd., Osaka, Japan

[21] Appl. No.: 942,636

[22] Filed: Sep. 9, 1992

[30] Foreign Application Priority Data

Sep. 28, 1991 [JP] Japan .............. 3-086907[U]

[51] Int. Cl.$^5$ .............................................. B62D 5/04
[52] U.S. Cl. .............................. 364/424.05; 364/424.01; 180/79.1; 180/140; 180/142
[58] Field of Search .................. 364/424.05, 426.03, 364/426.04, 426.02, 424.01; 180/79.1, 141, 142

[56] References Cited

U.S. PATENT DOCUMENTS

| | | | |
|---|---|---|---|
| 3,720,863 | 3/1973 | Ringland et al. | 318/52 |
| 3,758,836 | 9/1973 | Shibata | 318/197 |
| 3,895,276 | 7/1975 | Brown et al. | 318/231 |
| 4,249,113 | 2/1981 | Werner | 318/39 |
| 4,751,978 | 6/1988 | Drutchas et al. | 180/142 |
| 4,837,692 | 6/1989 | Shimizu | 364/424.05 |
| 4,875,539 | 10/1989 | Abukawa et al. | 180/79.1 |
| 4,940,102 | 7/1990 | Morishita | 180/79.1 |
| 4,977,507 | 12/1990 | Matsuoka et al. | 364/424.05 |
| 4,984,647 | 1/1991 | Morishita et al. | 180/79.1 |
| 5,097,420 | 3/1992 | Morishita | 364/424.05 |
| 5,097,918 | 3/1992 | Daido et al. | 180/79.1 |
| 5,109,184 | 4/1992 | Bahn | 318/254 |

FOREIGN PATENT DOCUMENTS

63-63262 4/1988 Japan .
64-41466 2/1989 Japan .

Primary Examiner—Thomas G. Black
Assistant Examiner—Jacques H. Louis-Jacques
Attorney, Agent, or Firm—Darby & Darby

[57] ABSTRACT

In an electric power steering apparatus using a direct drive electric motor for assisting steering force, the electric motor is operated with three-phase alternating current obtained from a direct-current power supply through an inverter, the three-phase alternating current being controlled by detecting the value of the direct current being supplied to the inverter. The difference between the detected direct current and a target current calculated on the basis of detected vehicle speed and steering torque is determined, based on which the three-phase alternating current is controlled.

2 Claims, 1 Drawing Sheet

CURRENT CONTROL FOR ELECTRIC POWER STEERING APPARATUS MOTOR

BACKGROUND OF THE INVENTION

1. Field of the Invention

The present invention relates to an electric power steering apparatus which uses an electric motor to provide power to assist the steering force for a vehicle.

2. Description of the Related Art

An electric power steering apparatus has been developed in which the speed of the vehicle and the steering torque applied to the steering wheel are detected and, when the detected torque exceeds a prescribed dead zone, a driving current, whose magnitude is determined according to the detected torque and vehicle speed, is supplied to drive a steering assisting electric motor whose rotating force is used to assist the force required for the vehicle steering, thereby providing a comfortable steering feel to the driver.

Such an electric power steering apparatus usually employs a direct drive motor as the steering assisting electric motor. The direct drive motor is suitable for use as a steering assisting electric motor since it does not require the use of a reduction gear and thus has the advantage of reducing the size of the motor-related hardware. In the electric power steering apparatus equipped with such a direct drive motor, a motor current controller sets a target current according to the detected torque and vehicle speed, and the direct drive motor is operated with three-phase alternating current supplied through an inverter according to the target current. However, the problem with this type of steering apparatus has been that the output torque of the electric motor is affected by a variation in the battery supply voltage as well as by the load change of the steering system, thereby causing an unnatural steering feel.

One previous approach to resolving this problem has been by current feedback control wherein the value of the three-phase alternating current for operating the motor is detected and the result of the detection is fed back to the motor current controller to control the three-phase alternating current in such a manner as to correct any deviation between the detected three-phase alternating current value and the target current value. More specifically, a current detecting resistor is inserted in an electric circuit path between the inverter and the electric motor; the three-phase alternating current value is detected using this current detecting resistor, and the thus detected three-phase alternating current value is dq converted by software (coordinate transformation of rotor windings to the static coordinate system), the dq current obtained as a result of the conversion being fed back to the motor current controller.

However, the above current feedback control of the prior art requires the use of a high-precision current sensor for detecting the three-phase alternating current value, but such a high-precision current sensor is large in size and not suitable for use in an electric power steering apparatus where miniaturization of hardware is a desired condition. Another problem with the prior art is that the complicated feedback control involving dq-converting the detected three-phase alternating current value increases the complexity of the software. This has created the further problem that the increased complexity of the software decreases the control response.

OBJECTS OF THE INVENTION

It is an object of the present invention to provide an electric power steering apparatus that can eliminate the unnatural steering feel caused by a variation in the supply voltage or by the load change of the steering system.

It is another object of the invention to provide an electric power steering apparatus that makes it possible to reduce the size of the hardware for controlling the current supplied to the steering assisting motor.

It is a further object of the invention to provide an electric power steering apparatus that makes it possible to simplify the software for controlling the current supplied to the steering assisting motor.

It is yet another object of the invention to provide an electric steering power apparatus that makes it possible to increase the control response for controlling the current supplied to the steering assistance motor.

According to the present invention, an electric power steering apparatus has means for detecting the direct current being supplied to an inverter and means for controlling three-phase alternating current on the basis of the detected direct current.

In the electric power steering apparatus, an unnatural steering feel is caused by a variation in the supply voltage or by the load change of the steering system. The variation in the supply voltage and the load change of the steering system both introduce a variation in the direct current being supplied to the inverter. In the electric power steering apparatus of the present invention, since the three-phase alternating current for operating the electric motor is controlled by detecting the direct current being supplied to the inverter, the direct current supplied to the inverter is prevented from varying due to a variation in the supply voltage or to a load change of the steering system, thus preventing an unnatural feel from being introduced into the steering feel. Furthermore, the current sensor used for controlling the motor current is one that detects direct current, which contributes to reducing the hardware size compared with the one used in the prior art. Moreover, the value of three-phase alternating current is controlled on the basis of the detection result of direct current. Since there is no need for complicated processing such as dq conversion required in the prior art apparatus, the control software can be simplified and thus, the control response is increased.

DESCRIPTION OF THE PREFERRED EMBODIMENTS

Figure 1:
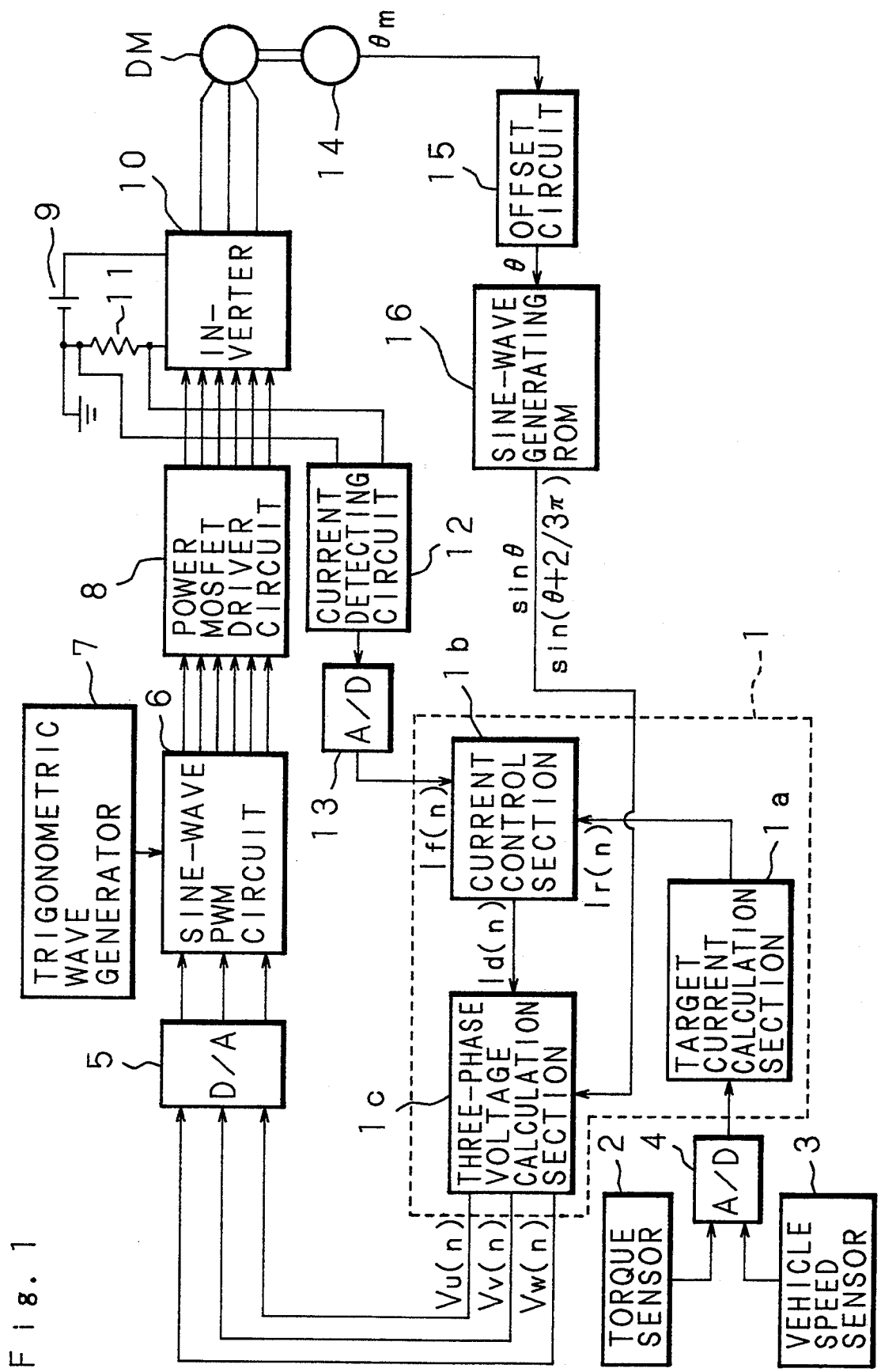
FIG. 1 is a functional block diagram illustrating the configuration of a control system in the electric power steering apparatus of the present invention.

The present invention will now be described in detail by way of example and with reference to the accompanying drawing.

Shown in FIG. 1 is a control system in the electric power steering apparatus of the present invention. In FIG. 1, the reference numeral 1 designates a microcomputer for steering assisting control; within the microcomputer 1, the software elements are represented by functional blocks. A torque detection signal from a torque sensor 2 that detects the steering torque and a vehicle speed detection signal from a vehicle speed sensor 3 that detects the vehicle speed are analog-todigital converted by an A/D converter 4 and fed to a target current calculation section 1a of the microcomputer 1. The target current calculation section 1a performs a prescribed operation on the basis of the supplied torque detection signal and vehicle speed detection signal, to determine a target current Ir(n) for operating a direct drive motor DM. The target current Ir(n) determined by the target current calculation section 1a is supplied to a current control section 1b.

Both electrodes of a battery 9, which supplies power to the direct drive motor DM, are connected to an inverter 10 formed from power MOSFET circuits which are used for energization control of the direct drive motor DM. The negative electrode of the battery 9 is also grounded. Inserted in a direct-current circuit for the inverter 10 is a current detecting resistor 11 for detecting the supply current (the direct current supplied to the inverter 10), the current detecting resistor 11 being connected to a current detecting circuit 12. The current detecting circuit 12 detects the supply current value from the voltage detected across the current detecting resistor 11. The detected current value is analog-to-digital converted by an A/D converter 13 and supplied as a detected supply current If(n) to the current control section 1b of the microcomputer 1.

The current control section 1b calculates the deviation of the detected supply current If(n) from the target current It(n), and the result of the calculation is supplied as a deviation current Id(n) to a three-phase voltage calculation section 1c.

Mounted on the direct drive motor DM is a rotational position sensor 14, constructed from an absolute encoder, for detecting the absolute value of the rotational position of the direct drive motor DM. The rotational position data detected by the rotational position sensor 14 is supplied as a detected rotational position signal $\theta$ m to an offset circuit 15 where the offset of the signal is adjusted. The signal with its offset adjusted is supplied as a rotational position signal $\theta$ to a sine-wave generating ROM 16. Of the three-phase sinusoidal waveforms having the phase angle given by the rotational position signal $\theta$, the sine-wave generating ROM 16 contains sinusoidal wave data for two phases [$\sin\theta$, $\sin(\theta+\frac{2}{3}\pi)$], the rotational position signal $\theta$ being used as the address. The sinusoidal wave data for two phases corresponding to the supplied rotational position signal $\theta$ are read into the three-phase voltage calculation section 1c.

In the three-phase voltage calculation section 1c, the deviation current 1d(n) is translated into a deviation voltage Vd(n) based on which operations of the following equations (1) to (3) are performed to determine three-phase voltages for supply to the direct drive motor DM. Equation (1) below is an operation expression for determining a sinusoidal voltage Vu(n) for the U phase of the direct drive motor DM; the sinusoidal voltage Vu(n) is calculated from the deviation voltage Vd(n) and the sinusoidal wave $\sin\theta$ supplied from the sine-wave generating ROM 16.

$$Vu(n) = Vd(n) \cdot \sin\theta \qquad (1)$$

Equation (2) below is an operation expression for determining a sinusoidal voltage Vv(n) for the V phase of the direct drive motor DM; the sinusoidal voltage Vv(n) is calculated from the deviation voltage Vd(n) and the sinusoidal wave $\sin(\theta+\frac{2}{3}\pi)$ supplied from the sine-wave generating ROM 16.

$$Vv(n) = Vd(n) \cdot \sin(\theta+\tfrac{2}{3}\pi) \qquad (2)$$

Equation (3) below is an operation expression for determining a sinusoidal voltage Vw(n) for the W phase of the direct drive motor DM; the sinusoidal voltage Vw(n) is calculated from the sinusoidal voltage Vu(n) obtained from equation (1) and the sinusoidal voltage Vv(n) obtained from equation (2).

$$Vw = -[Vu(n) + Vv(n)] \qquad (3)$$

The three-phase sinusoidal voltages Vu(n), Vv(n), and Vw(n) obtained from the above operations by the three-phase voltage calculation section 1c are digital-to-analog converted by a D/A converter 5 and supplied to a sine-wave PWM circuit 6. Also supplied to the sine-wave PWM circuit 6 is a trigonometric wave signal generated by a trigonometric wave generator 7. The sine-wave PWM circuit 6 compares the three-phase sinusoidal voltages with the trigonometric wave signal and, based on the results of comparison, PWM signals for controlling the direct drive motor DM are supplied to a power MOSFET driver circuit 8. Based on the PWM signals, the power MOSFET driver circuit 8 drives power MOSFETs (not shown) in the inverter 10. The inverter 10 is formed from three series circuits of power MOSFETs, the three circuits being connected in parallel. The power MOSFET driver circuit 8 commutatively controls these power MOSFETs to supply the three-phase sinusoidal current to the direct drive motor DM, thus driving the direct drive motor DM.

In the electric power steering apparatus having the above configuration, when there occurs a variation in the supply voltage from the battery 9 or when the load change of steering system is caused, the supply current exhibits a variation. The variation of the supply current is detected by the current detecting circuit 12, in accordance with which the detected supply current If(n) varies. The current control section 1b calculates the deviation current Id(n) to compensate for the variation of the detected supply current If(n), and supplies the deviation current Id(n) to the three-phase voltage calculation section 1c. The three-phase voltage calculation section 1c transforms the supplied deviation current Id(n) into the three-phase sinusoidal voltages which are then supplied to the sine-wave PWM circuit 6 through the D/A converter 5. The three-phase sinusoidal voltages ape thus corrected to compensate for the variation of the supply current, thus correcting for the variation of the supply current caused by a variation in the supply voltage from the battery 9 or by the load change of steering system. That is, in the above control system, feedback control is performed with respect to the supply current.

In the above supply current feedback control, when there occurs a variation in the supply voltage from the battery 9 or when the load change of steering system is caused, the resulting supply current variation is corrected as described above. This contributes to preventing an unnatural feel from being introduced in the steering feel by a variation in the supply voltage from the battery 9 or by the load change of steering system.

As described above, according to the present invention, the direct current being supplied to the inverter is detected in order to control the three-phase alternating-current voltages. Since the detection of direct current can be accomplished by a small-size current sensor, the hardware can be reduced in size, and since the control of three-phase alternating current is performed on the basis of the direct current being supplied to the inverter, i.e., the detection result of the direct current, the above configuration serves to eliminate the need for complicated processing, such as dq conversion in the prior art, and offers excellent advantages such as simplified software and hence, increased response of control.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by this claims.

What is claimed is:

1. An electric power steering apparatus for a vehicle comprising:
    an electric direct drive motor which rotates for assisting steering force of the steering apparatus;
    an inverter adapted to be connected to a direct current power supply for producing three-phase alternating current to operate said motor;
    means for detecting the direct current supplied to the inverter including
        a resistor in circuit with the direct-current supply for the inverter across which a voltage is produced corresponding to the current supplied to the inverter, and
        a detecting circuit connected to said resistor for detecting the direct current from the voltage detected across said resistor;
    means for controlling the three-phase alternating current on the basis of the detection result by said detecting means including
        means for calculating a target current for the operation of the electric motor on the basis of the detection results of vehicle speed and steering torque,
        means for determining the difference between the current detected by said detecting means and the target current, and
        means for controlling the three-phase alternating current on the basis of the determined difference;
    a sensor for detecting the rotational position of the electric motor; and
    output means for supplying to said control means sinusoidal wave data for at least two phases based on the rotational position detected by said sensor.

2. An electric power steering apparatus for a vehicle comprising:
    an electric direct drive motor which rotates for assisting steering force of the steering apparatus;
    means for providing a connection to a direct-current power supply for supplying power to said electric motor;
    a first sensor for detecting vehicle speed;
    a second sensor for detecting steering torque;
    a third sensor for detecting the rotational position of said electric motor;
    an inverter between said electric motor and the direct-current power supply for supplying three-phase alternating current to said electric motor;
    means for detecting the direct current being supplied to said inverter including
        a resistor in circuit with the direct-current power supply and said inverter across which a voltage is produced corresponding to the current supplied to said inverter, and
        a detecting circuit connected to said resistor for detecting the direct current from the voltage detected across said resistor;
    means for controlling the three-phase alternating current produced by said inverter on the basis of the detection result by said detecting means;
    output means for supplying to said control means sinusoidal wave data for at least two phases of the current supplied to said motor based on the rotational position detected by said third sensor;
    said controlling means comprising:
        a first calculating means for calculating a target current for the operation of said electric motor on the basis of the detected vehicle speed and steering torque;
        a second calculating means for calculating the difference between the current detected by said detecting means and the target current; and
        a third calculating means for calculating three-phase alternating-current voltages for supply to said electric motor on the basis of the difference calculated by said second calculating means and the sinusoidal wave data for at least two phases supplied from said output means.

* * * * *